Dec. 19, 1961     F. C. MELCHIOR     3,013,434
AUTOMATIC INDICATING AND CONTROL INSTRUMENT
Filed Dec. 3, 1956     3 Sheets-Sheet 1
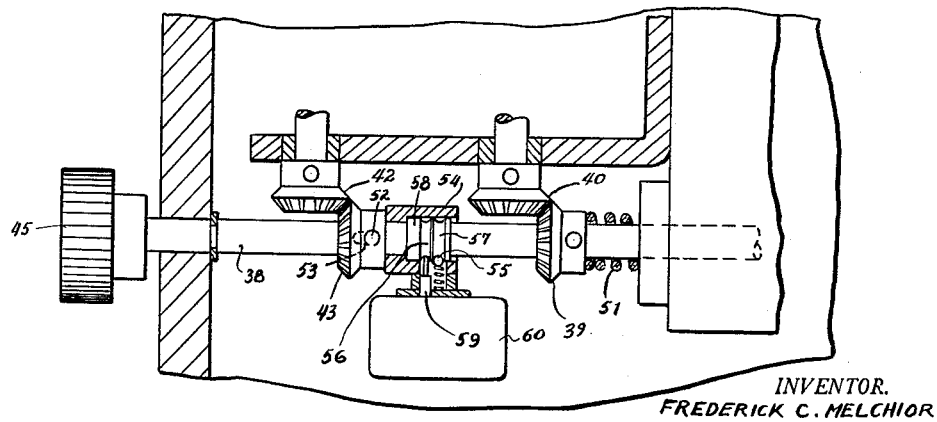
INVENTOR.
FREDERICK C. MELCHIOR
BY
ATTORNEY Dec. 19, 1961     F. C. MELCHIOR     3,013,434
AUTOMATIC INDICATING AND CONTROL INSTRUMENT
Filed Dec. 3, 1956     3 Sheets-Sheet 2
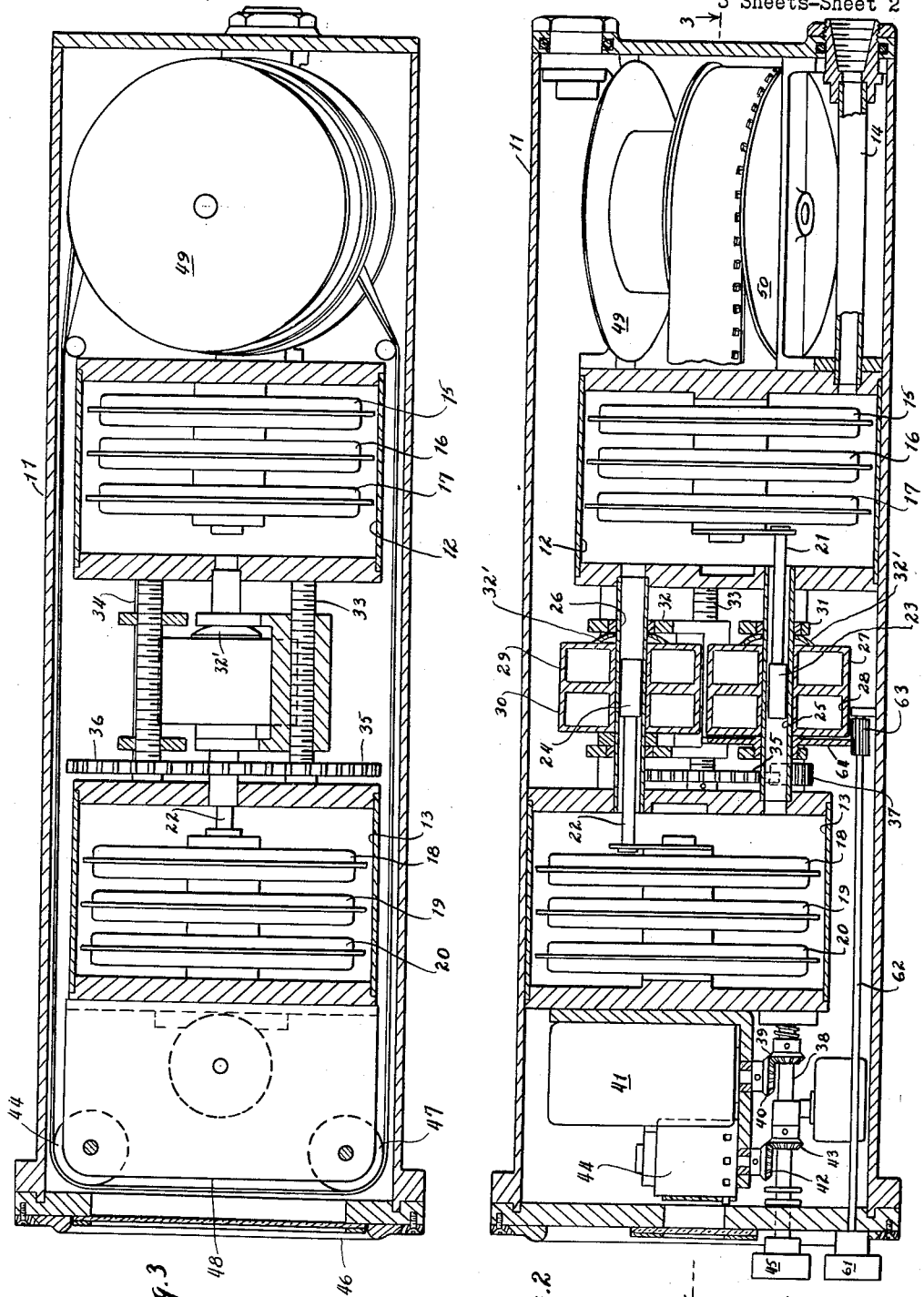
INVENTOR.
FREDERICK C. MELCHIOR
BY
ATTORNEY

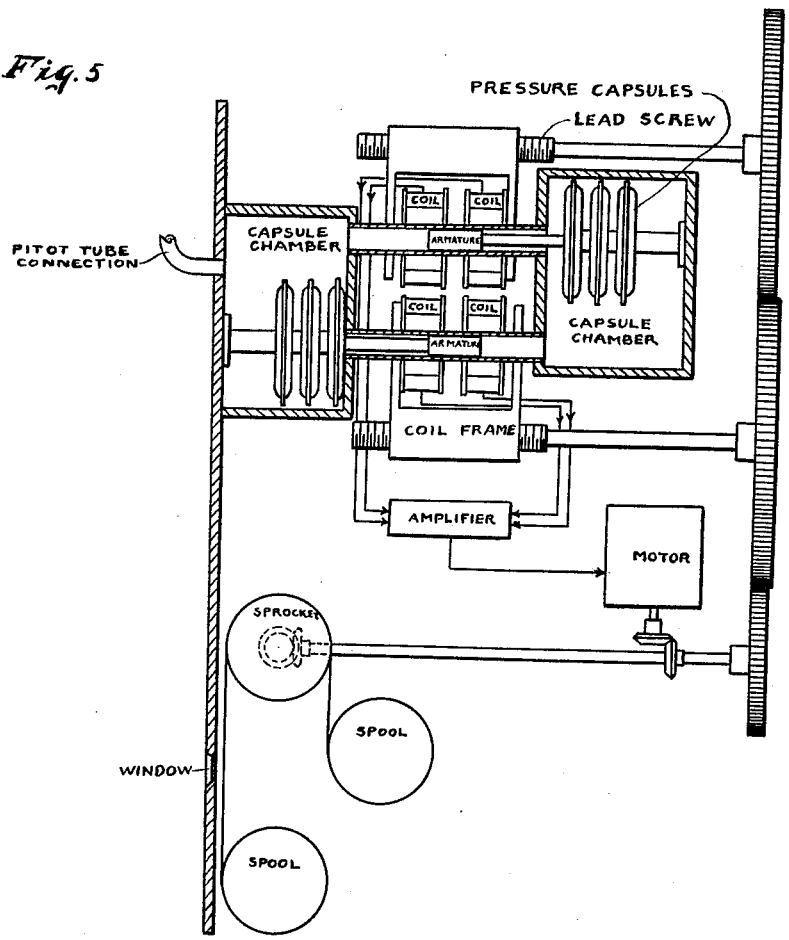

United States Patent Office 3,013,434
Patented Dec. 19, 1961

3,013,434
AUTOMATIC INDICATING AND CONTROL INSTRUMENT
Frederick C. Melchior, 258 Riverside Drive, New York, N.Y.
Filed Dec. 3, 1956, Ser. No. 625,711
23 Claims. (Cl. 73—387)

This invention relates to instruments in which the motion of factor responsive elements is automatically translated into precise and instantaneous indication and control of values. Primarily, it relates to sensitive instruments which are required to respond, instantly and accurately, to extremely minute changes in factor values, and, as a suitable example, particular reference is here made to an aircraft altimeter, largely because of the prominent need for radical improvements in this field. Moreover, the instrument here described is capable of performing three distinct functions, namely, to present instantaneous altitude readings with an overall absolute accuracy many times greater than that of any conventional instrument; when pre-set for a given altitude value it will control, that is, by way of the auto-pilot it will cause the aircraft to maintain such altitude with the same order of accuracy and with a re-positioning sensitivity of a still higher order; by means of a simple accessory, which may or may not be an integral part of this instrument, it will also indicate and/or control rates of climb and descent, as desired.

More completely and specifically, the objects of the invention are:

(1) To obtain an instrument of optimum overall accuracy of instantaneous readings over the entire operating range—such readings presented in a manner to preclude mistakes and time consuming attention.

(2) To obtain a sensitivity of such an order as to produce an active re-positioning response to minute variations in altitude, so as to prevent "hunting" when the instrument is used as a controlling device.

(3) To produce an instrument, such as the foregoing, the primary sensing and actuating system of which operates without lag, so that the speed of the follow-up servo cooperating with the said system becomes a true and instantaneous expression of rate of change for indication and control thereof.

(4) To produce an instrument, such as the foregoing, that is immune to temperature variations, acceleration and gravitation forces.

(5) To provide ways and means for accurate, instantaneous and reliable adjustments to compensate for variations of extraneous factors, such as barometer pressure, so as to make absolute values directly available for observation and control.

(6) To obtain the utmost simplicity of operating components, and in their arrangement, so that they may be contained in a case of practical dimensions, without impairment of performance or functional efficiency.

Further objects and merits of this invention will become evident from the accompanying drawings of an instrument, designed in accordance with the subject invention, together with the ensuing description.

In the drawings—

FIG. 1 is a broken view showing in perspective an instrument.

FIG. 2 is a longitudinal section in the vertical plane of such an instrument.

FIG. 3 is a view similar to FIG. 2 but taken at right angles thereto.

FIG. 4 is an enlarged view of the forward section between the servo system and the indicating mechanism.

FIG. 5 is a diagrammatic view showing the operation of the instrument.

From these drawings it is readily seen that, with a few exceptions, and/or additions, the subject invention embodies the same basic elements, components and working principle, as are set forth and described in prior Melchior patent U.S. No. 2,603,728, issued July 15, 1952, and No. 2,656,721, issued October 27, 1953.

Certain new and additional components and design features contribute tangible, novel and superior operating and performance characteristics which, heretofore, have not been available in any type of instrument and thus are believed to represent proper and legitimate subject matter of invention. Regardless of the arrangement of components and design features, which may be chosen or preferred for any one particular use or purpose, the basic working principle and elements remain the same; and so the scope of this invention embraces a diversity of precision measurements for indication and control of values and must, therefore, not be construed as being limited to the exact embodiment described and set forth in this specification, such limitations being determined solely by the ramifications of the claims.

Looking now at FIG. 1, we see what may be termed a "live" picture representing the artist's concept of an operational unit, showing the instrument assembly with the major elements in their relative positions. In order to properly identify these various elements and components, so as to make this illustration clear and comprehensive in all details, it will, however, be necessary to first examine some of the other more conventional and precise illustrations.

Turning to FIG. 2, there is shown a case 11 containing two communicating gas tight chambers 12 and 13 receiving ambient outside air (static) pressure by way of a connecting tube 14. In each of these chambers is mounted a group of three pressure sensitive (aneroid) capsules constitutes a capsule assembly. While I have shown three capsules in each assembly the number may be varied at will. The capsules shown are 15, 16, 17, and 18, 19, 20, which are of the concentrically corrugated diaphragm type described in Melchior Patent No. 2,760,260 and now well known to the art. The capsules in these groups are joined together by means of screw threads in their center hubs and are suspended by the rear-most ones, respectively 15 and 20. In a similar manner, the groups opposing each other as shown, so as to produce opposite reciprocal motion when the capsules expand and contract in response to pressure changes—the stroke of each group being the sum total produced by its three capsules for any given change in pressure.

Each of the front capsules, 17 and 18, mounts a non-magnetic rod, 21 and 22, with a soft iron slug, 23 and 24, affixed to its far end, moving inside thin-walled non-magnetic tubes, 25 and 26, which serve as gas-tight communication and structural spacing members between the chambers 12 and 13. Additional such tubular spacing members may be provided for structural rigidity and pressure communication between the said chambers without lag. Slidably mounted on each of the tubes 25 and 26 is a pair of inductance coils, respectively 27 and 28, 29 and 30, each pair embraced by the jaws of a nut, 31 and 32, and spring loaded in one direction by the springs 32'. The nuts in their turn travel on the lead screws 33 and 34 whose pinions 35 and 36 mesh to provide opposite rotation on the lead screws and thereby reciprocal motion on the nuts propelling the inductance coils. These latter components are shown very clearly in FIG. 3.

As may be seen in FIG. 2, the slugs 23 and 24 occupy a midway or "null" position between their respective coils, each of which has primary and secondary windings. There is an input—in this instance 400 cycle A.C.—into the primary, whereas the outputs of the secondary windings are nullified or balanced against each other by the null balance position of the slugs or "armatures." To conform with the aforementioned reciprocal motion of the slugs, the coils are connected in series in a corresponding manner—27—30 and 28—29. Thus, when the capsules expand with increasing altitude, the slugs move a certain distance away from null position; that is, the same distance out of coils 27 and 30 as they move further into coils 28 and 29. Conversely, with decreasing altitude, the reverse takes place. The departure of the slugs from "null" position produces a differential output in the series-connected secondary windings since these are null-connected or connected in opposition, this output representing a signal in one direction or another, depending upon which coils are "favored," and this signal is used in ways as hereinafter described. The combination of coils in null-balance with an armature is merely a differential transformer operating on the elementary principle of the Wheatstone bridge and, therefore, requires no detailed explanation.

The arrangement as here presented—which may be termed a double inductance bridge—does, however, offer distinctly new and superior features and advantages which, in combination with other new and specific design features, make possible the fulfillment of the aforestated objects of the subject invention.

Turning again to FIGS. 2 and 3, we find that, engaging the pinion 35 there is a smaller, elongated pinion 37 on a shaft 38 extending through the forward part of the instrument where there is mounted on it a bevel gear 39 engaging a similar gear 40 on the servo motor 41, and further forward a slidably mounted bevel gear 43 engaging another similar gear 42 on the sprocket spool 44, the shaft 38 terminating with a knob 45 outside the face of the instrument.

When the slugs 23 and 24 depart from their respective null positions, the differential output from the secondary coil windings, amplified in a conventional type of tube or transistor system, well known to the art, causes the servo motor to turn, thereby moving the coils, reciprocally in conformance with the motion of the slugs, until null balance has been restored. Inasmuch as this motion of the coils is transmitted from the servo motor by way of the shaft 38, it is obvious that the said motor simultaneously drives the sprocket spool 44 in constant synchronization with the inductance bridge.

Referring now to FIG. 3, we find immediately behind the window 46 two spools—one of them being the sprocket spool 44, the other one an idler spool 47—over which runs a tape scale 48, carried by these spools so close to the window that values may be read with negligible parallax, and stored on differential spools 49 and 50, hereinafter called reels, in the rear of the instrument. Inside the reel bodies are spring counteracting each other to keep the tape scale taut and to allow for variations in relative diameters as one reel empties and the other one fills up, and vice versa, the two always turning in the same direction. Matching the sprocket spool 44 are perforations in the tape scale (which, in fact, is made from motion picture film stock) keeping it always perfectly synchronized with the inductance bridge and the sensing elements, so that its division lines always repeat exactly the same readings for any given pressure values. This scale arrangement is identical with that shown and described in U.S. Patents No. 2,603,728, issued July 15, 1952, and No. 2,656,721, issued October 27, 1953. Its advantages are quite obvious: Because the synchronized scale is a continuous tape, it can be "custom calibrated," increment by increment over its entire length, to correct for minor vagaries and also for errors of extraneous nature caused by installation factors, one example being that of static pressure pick-up; moreover, the extraordinary scale length possible—in the altimeter about 40–50 feet, in the Master size 100–120 feet—offers a readability heretofore not obtainable in precision instruments.

Turning further to FIG. 4, we see an enlarged view of the mechanical connection between the scale mechanism and the servo motor by way of the propeller shaft 38.

As previously stated, the pinion 37 is elongated to permit slight axial motion. Pushing the shaft 38 in (rearward) a small fraction of an inch disengages the bevel gear 39 from bevel gear 40 on the servo motor, simultaneously compressing the spring 51, whereas the slidably mounted bevel gear 43, turned by the shaft pin 52 in the slot 53 in the gear body and backed by the bearing 54, remains permanently engaged with the sprocket spool gear 42.

As may be noted, a spring loaded steel ball 55 locks the shaft in either position by lodging itself, toggle fashion, in one or the other of the two grooves 56 and 57. When the shaft 38 is pushed in, mechanically disengaging gears 39 and 40 and thereby the servo motor, the shoulder 59 depresses the pin 59 of the two-way micro-switch 60, which then directs the signal from the inductance bridge to the control servo, in this case that of the auto pilot. By turning the knob 45 the inductance bridge may then be set for any desired altitude as indicated by the scale. The signal from the bridge, previously causing the servo motor 41 to maintain the coils in null balance with the armatures, now causes the auto pilot control servo to so govern altitude as to keep the armatures in null balance with the preset bridge; and thus the instrument operates equally well, and with the same order of accuracy, as an altitude control unit.

Returning again to FIG. 2, we find a second knob 61 on a shaft 62, also with an elongated pinion 63 of a length exceeding that of the travel of the coils, so as to keep it in mesh with the larger pinion 64 between one of the "jaws" of the nut 31 and the pair of coils embraced by it. The hub of the pinion 64 is threaded into the said "jaw" so that, when it is turned by the pinion 63, it displaces the coils longitudinally against the opposing spring, between the jaws of the nut, away from the null position in one direction or another. The consequent differential may be represented by gearing the shaft 62 to an index 65 moving along a concentric scale 66 on the bezel of the instrument. By calibrating this scale in units of barometer pressure, increment by increment according to its effect on pressure altitude, true altitude may be obtained by turning the knob 61, and thereby the index 65, to the barometer pressure reported for sea level.

It will be understood that in operation airports would be equipped with a master instrument to record the absolute barometric pressure and that this information would be relayed to the pilots by radio so that a plane coming in for a landing or passing within radio range of an airport could correct the altimeter to get the correct altitude reading by adjusting the knob 61.

In FIG. 5 I have shown a diagrammatic view showing the operation of my instrument. While this view does not show the exact arrangement set forth in the other drawings, it is believed that it clearly indicates the operation and characteristics of the instrument.

As is commonly known, barometer pressure is directly convertible into pressure altitude which, in turn, conforms with true altitude only on a standard day. When atmospheric conditions are not standard, the roughly logarithmic column of pressure altitude is shifted up or down (stretched or compressed) in relation to sea level where corresponding variations in barometer pressure occur. As pressure sensing elements are "interested" in pressure variations only, it is obvious that some form of correction is required to obtain true altitude readings. As these shifts in the atmospheric column are not linear, it is clear that, to correct for them, the coil displacement by way of the shaft 62 must follow a scale that is "custom calibrated," increment by increment, in units of barometer pressure, as is the case with the scale 66 where the index 65 is geared to the shaft 62. Greater scale length, with proportionately improved readability, can, of course, be obtained by gearing the shaft 62, in the same way the shaft 38 is geared to the sprocket spool 44, to an auxiliary tape scale mechanism similar to that of the tape scale 48, except smaller and much more compact.

Immunity to temperature variations is primarily a matter of an equation of linear expansion coefficients, between the capsule groups with their armature rods on the one hand, and the capsule chambers with their spacing members on the other. It should be noted that this can be done singly, with each individual group assembly, whereas cancellation of the effects of acceleration and gravitation forces is predicated upon the reciprocally opposite motion of the capsule armatures as the only factor producing a signal in the bridge. Inasmuch as the masses and spring rates of the two capsule groups with their armatures are equal, it is clear that the application of any given force, either by acceleration or by gravitation, will cause a shift in the position of the armatures of the same magnitude, and in the same direction; and, inasmuch as it has been shown that—due to the arrangement of the coils in the circuit—only reciprocally opposite motion on the part of the armatures will produce a signal, it is also clear that, thereby, the effects of acceleration and gravitation forces are canceled out in the inductance bridge.

It is believed that the elements of compactness, simplicity, ruggedness or structure and functional efficiency, speak for themselves. Normally, the superlatives of accuracy and sensitivity are associated with delicate and intricate structures, often of considerable bulk; however, by "unloading" the capsules in a manner as hereinbefore described, it has become possible to preserve their inherent qualities of performance, with a staunchness of structure not approached in precision instruments of other types; moreover, the simplicity of design of components and their arrangement has made it practical to package this structure in an aircraft size case (3.25 x 3.25 inches) and yet to sustain the order of performance, referred to earlier in this specification.

I claim:

1. A pressure-sensitive instrument including a pair of substantially oppositely arranged, capsule assemblies, each of said assemblies carrying an armature laterally offset from the axis of the assembly, said armatures being disposed in side-by-side, spaced relation and within pairs of axially shiftable primary and secondary coils respectively with the secondary coils connected in a circuit in series-opposition whereby the movements of said armatures will upset the null balance between said coils and will transmit a signal, said pairs of coils being in side-by-side relation and substantially coextensive with each other; and means controlled by said signal for effecting axial movement of the coils to rebalance the coil circuit.

2. A pressure sensitive instrument including a plurality of oppositely disposed capsule assemblies, an armature controlled by each of said capsule assemblies, a plurality of coils associated respectively with said armatures, there being a separate coil surrounding each of said armatures, each of said coils having a primary and a secondary winding, circuit means connecting the secondary coils in series-opposition, means for moving said coils to maintain a null balance between said coils, and indicator means actuated by said coil-moving means.

3. In an altimeter or the like a pair of oppositely disposed pressure sensitive elements, each of said pressure sensitive elements having an armature disposed within a coil, each of said coils having a primary and a secondary winding, a circuit connecting said coils through an amplifier to a servo motor, means operated by said servo motor to move said coils to maintain a null balance between said coils, and indicator means actuated by said coil-moving means.

4. In an altimeter or the like a pair of oppositely disposed pressure sensitive elements, each of said pressure sensitive elements having an armature disposed within a coil, each of said coils having a primary and a secondary winding, a circuit connecting said coils through an amplifier to a servo motor, means operated by said servo motor to move said coils to maintain a null balance between said coils, and a calibrated tape scale synchronized with such servo motor indicating any change in pressure.

5. In an altimeter or the like a pair of oppositely disposed pressure sensitive elements, each of said pressure sensitive elements having an armature connected thereto disposed within a coil, each of said coils having a primary and a secondary winding, a circuit connecting said coils through an amplifier to a servo motor, means operated by said servo motor to move said coils to maintain a null balance between said coils, additional means to move said coils to correct for changes in barometric pressure, and indicator means actuated by said servo-motor.

6. In an altimeter or the like a pair of oppositely disposed pressure sensitive elements, each of said pressure sensitive elements having an armature disposed within a coil, each of said coils having a primary and a secondary winding, a circuit connecting said coils through an amplifier to a servo motor, means operated by said servo motor to move said coils to maintain a null balance between said coils, a calibrated tape scale synchronized with such servo motor indicating any change in pressure, and manually operated means to vary the position of said coils to correct for changes in barometric pressure.

7. In an altimeter apparatus which is subject to the force of gravity and adapted to be used in conditions where it is moved and has a velocity, said apparatus providing a response minimizing the effect of pulls on its mass and comprising a pressure sensitive element having an armature disposed within a coil, a resiliently held movable member movable in a direction substantially parallel to said element and having a separate armature disposed within a separate coil, said member having a mass adapted to be acted on by gravity or by a change of velocity of the apparatus to effect movement of the member, each of said coils having a primary and a secondary winding, a circuit connecting said secondary coils in series opposition through an amplifier to a servo motor, means operated by said servo motor to relatively move said coils to maintain a null balance between said coils, and a calibrated tape scale synchronized with such servo motor, indicating any change in pressure, said element, member and armatures being adapted to move in the same direction in response to pulls on the masses thereof, thereby to minimize the effect of gravity or the effect of changes of velocity of the apparatus.

8. In an altimeter apparatus which is subject to the force of gravity and adapted to be used in conditions where it is moved and has a velocity, said apparatus providing a response minimizing the effect of pulls on its mass and comprising a pressure sensitive element having an armature disposed within a coil, a resiliently held movable member movable in a direction substantially parallel to said element and having a separate armature disposed within a separate coil, said member having a mass adapted to be acted on by gravity or by a change of velocity of the apparatus to effect movement of the member, each of said coils having a primary and a secondary winding, a circuit connecting said secondary coils in series-opposition through an amplifier to a servo motor, means operated by said servo motor to relatively move said coils to maintain a null balance between said coils, a calibrated tape scale synchronized with such servo motor, indicating any change in pressure, and manually operated means to vary the position of said coils to correct for changes in barometric pressure, said element, member and armatures being adapted to move in the same direction in response to pulls on the masses thereof, thereby to minimize the effect of gravity or the effect of changes of velocity of the apparatus.

9. In combination, a factor responsive element, first and second coils defining a null position therebetween, a first armature coupled to said element for movement along a first axis, means for generating a first signal the amplitude of which varies as the displacement of said first armature from said null position and the phase of which is responsive to the direction of displacement, said generating means including said first and second coils, third and fourth coils defining a null position therebetween, a second armature mounted for movement from said null position defined by said third and fourth coils along an axis parallel with said first axis, means for generating a second signal, the amplitude of which varies as the displacement of said second armature from said null position defined by said third and fourth coils and the phase of which is responsive to the direction of displacement, means responsive to said first and second signals for generating an error signal responsive to factor change alone, and means responsive to said error signal for simultaneously indicating said change and for moving said coils to reposition the null positions relative to the respective armatures.

10. A combination in accordance with claim 9 in which said second armature is resiliently mounted, the mass of said second armature and the spring constant of said resilient mounting being dimensioned so that the ratio of mass to spring constant is substantially the same as the ratio of the mass of said first armature and the spring constant of the factor responsive element on which said first armature is mounted.

11. A combination in accordance with claim 9 which includes a second factor responsive element coupled to said second armature, the mass and spring constant of said second armature and element being substantially the same as the ratio of the mass and spring constant of said first armature and element.

12. An altimeter comprising a pressure responsive element, a first and second coil defining a null position therebetween, an armature coupled to said element, means for generating an error signal as said armature is displaced from said null position, said last named means including said first and second coils, means responsive to said error signal to move said coils to align said null position and said armature, a continuous tape scale, said scale being calibrated in suitable units of measure, and means responsive to said moving means to move said scale to indicate changes in the position of said armature in terms of said calibrated units of measure.

13. A combination in accordance with claim 12 in which said scale is calibrated in altitude units and in which includes means for manually moving said coils without affecting said signal responsive means to compensate for variations in ambient barometric pressure and means for indicating the amount of coil displacement.

14. An altimeter comprising a pressure-sensitive unit, a ferro-magnetic core attached to said unit and movable therewith, a magnetic detector surrounding said first core and slidable relative thereto, said detector producing a control voltage depending on the core position, said detector being initially positioned relative to said core to produce a null signal at sea level, control means responsive to said control signal and operatively coupled to said detector to shift the position thereof relative to said core to reestablish said null above and below sea level, indicator means operatively coupled to said control means to provide a height reading, and means to introduce into said control means a compensating signal depending on the acceleration to which the altimeter is subjected to cancel out the effect of any acceleration component in said control voltage.

15. An altimeter comprising a pressure-sensitive unit, a first magnetic core attached to said unit and movable therewith, a first magnetic detector surrounding said first core and slidable relative thereto, said first detector producing a control voltage depending on the core position, said first detector being initially positioned relative to said first core to produce a null signal at sea level, servo control means responsive to said control signal and operatively coupled to said detector to shift the position thereof relative to said core to re-establish said null above and below sea level, indicator means operatively coupled to said control means to provide a height reading, and means to introduce into said control means a compensating signal depending on the acceleration to which the altimeter is subjected to cancel out the effect of the acceleration component in said control voltage, said compensating means including a second core resiliently mounted to be responsive to acceleration forces and being dynamically balanced with respect to the assembly of said unit and said first core, a second magnetic detector surrounding said second core and fixedly mounted to produce said compensating signal.

16. An altimeter of high sensitivity and accuracy comprising an aneroid unit, a sealed chamber for housing said unit and communicating with the atmosphere, a tubular extension on said chamber, a first ferro-magnetic core attached to said unit and reciprocal within said extension in accordance with changes in atmospheric pressure, a first magnetic detector slidably mounted on said extension to produce a control signal which depends on the relative positions of said core and said detector, a servo-system responsive to the output of said detector and operatively coupled to said detector to shift the position thereof in a direction and to an extent establishing a null, a main indicating scale operatively coupled to said servo-system to provide altitude readings, control means to set the initial position of said first detector in accordance with existing atmospheric pressure, an auxiliary scale operatively coupled to said control means to provide barometric readings, and a compensator including a second core resiliently mounted to be responsive to acceleration and gravitational forces and dynamically balanced with respect to the assembly of said first core with said aneroid unit, a second magnetic detector surrounding said second core and positioned to produce a compensating signal depending on said forces, and means to apply said compensating signal to said servo-system to balance out contaminating components in said control signal.

17. An altimeter, as set forth in claim 16, wherein said chamber is formed of a material having a temperature coefficient characteristic which matches that of said aneroid unit.

18. An altimeter of high sensitivity and accuracy comprising an aneroid unit, a sealed chamber for housing said unit and communicating with the atmosphere, a tubular extension on said chamber, a first ferro-magnetic core attached to said unit and reciprocal within said extension in accordance with changes in atmospheric pressure, a first magnetic detector slidably mounted on said extension and constituted by a pair of annular coils forming a differential transformer to produce a control signal which depends on the relative positions of said core and said coils, a servo system responsive to the output of said differential transformer and operatively coupled to said detector to shift the position thereof in a direction and to an extent establishing a null, a main indicating scale operatively coupled to said servo system to provide altitude readings, control means including a barometric correction mechanism to set the initial position of said first detector in accordance with existing atmospheric pressure, an auxiliary scale operatively coupled to said control means to provide barometric readings, and a compensator including a second core resiliently mounted to be responsive to acceleration and gravitational forces and dynamically balanced with respect to the assembly of said first core and the aneroid unit, a second magnetic detector surrounding said second core and fixedly positioned to produce a compensating signal depending on said forces, and means to apply said compensating signal to said servo system to balance out contaminating components in said control signal.

19. An altimeter of high sensitivity and accuracy comprising an aneroid unit, a sealed chamber for housing said unit and communicating with the atmosphere, a tubular extension on said chamber, a first ferro-magnetic core attached to said unit and reciprocal in said extension in accordance with changes in atmospheric pressure, a first magnetic detector slidably mounted on said extension and constituted by a pair of annular coils forming a differential transformer to produce a control signal which depends on the relative positions of said core and said coils, a servo-system including an amplifier responsive to the output of said differential transformer and a motor energized from said amplifier and operatively coupled to said detector to shift the position thereof in a direction and to an extent establishing a null, a main indicating scale operatively coupled to said motor to provide altitude readings, control means including a barometric correction mechanism to set the initial position of said first detector in accordance with existing atmospheric pressure, an auxiliary scale operatively coupled to said control means to provide barometric readings, and a compensator including a second core resiliently mounted to be responsive to acceleration and gravitational forces and dynamically balanced with respect to the assembly of said first core and the aneroid unit, a second magnetic detector surrounding said second core and positioned to produce a compensating signal depending on said forces, and means to apply said compensating signal to said amplifier in phase opposition to said control signal to balance out contaminating components in said control signal.

20. An altimeter of the aneroid type comprising a pair of oppositely disposed pressure-sensitive elements provided with armatures carrying magnetic cores, said elements being arranged whereby a given change in pressure effects equal and opposite movement of said cores, an inductive device surrounding each armature and constituted by a frame supporting a pair of annular transformers having primary and secondary windings, means connecting the secondaries of the transformers in series to form a control circuit, the primaries of said transformers being connected to an alternating voltage source whereby said control circuit produces zero voltage only when the cores occupy corresponding positions relative to the associated pair of transformers, means to simultaneously adjust the initial positions of said frames relative to said cores to correct for sea level barometric pressure, means coupled to said frames and responsive to the voltage produced by said control circuit to simultaneously adjust the positions of said frames relative to said cores in a direction and to an extent re-establishing zero voltage in said control circuit, and indicator means responsive to the positions of said frames and displaying altitude units.

21. In combination, a factor responsive element, an armature coupled to said element, an electrical detector defining a null position, means for generating a first signal the amplitude of which varies as the displacement of said armature from said null position and the phase of which is responsive to the direction of displacement, said signal generating means including said detector, means responsive to existing acceleration forces to produce a second signal, means responsive to said first signal and said second signal for generating an error signal responsive to factor change alone, and means responsive to said error signal for simultaneously indicating said change and for moving said detector to reposition the detector null position relative to said armature.

22. A pressure sensitive instrument including a first and second capsule assembly, a first armature and a second armature respectively coupled to said first and second capsule assembly, a first detector defining a first null position and adapted to generate a first electrical signal responsive to movement of said first armature from said first null position, a second detector defining a second null position and adapted to generate a second electrical signal responsive to movement of said second armature from said second null position, means responsive to the sum of the signals produced by said first and second detectors to maintain a null balance in said detectors, and indicator means actuated by said detector moving means.

23. An altimeter comprising a pressure sensitive unit, an armature attached to said unit and movable therewith, a detector associated with said armature and movable relative thereto, said detector producing a control voltage depending upon the armature position, said detector being initially positioned relative to said armature to produce a null signal, control means responsive to said control signal and operatively coupled to said detector to shift the position thereof relative to said armature to re-establish said null, indicator means operatively coupled to said control means to provide a height reading, and means to introduce into said control means a compensating signal depending on the acceleration to which the altimeter is subjected to cancel out the effect of any acceleration component in said control voltage.

References Cited in the file of this patent

UNITED STATES PATENTS

| | | |
|---|---|---|
| 2,126,855 | Wunsch et al. | Aug. 16, 1938 |
| 2,627,183 | Greenwood et al. | Feb. 3, 1953 |
| 2,656,721 | Melchior | Oct. 27, 1953 |
| 2,845,514 | Senseney et al. | July 29, 1958 |